June 4, 1929.  J. L. ATKINSON  1,715,734
MECHANICAL GEAR SHIFT
Filed March 23, 1928  3 Sheets-Sheet 3
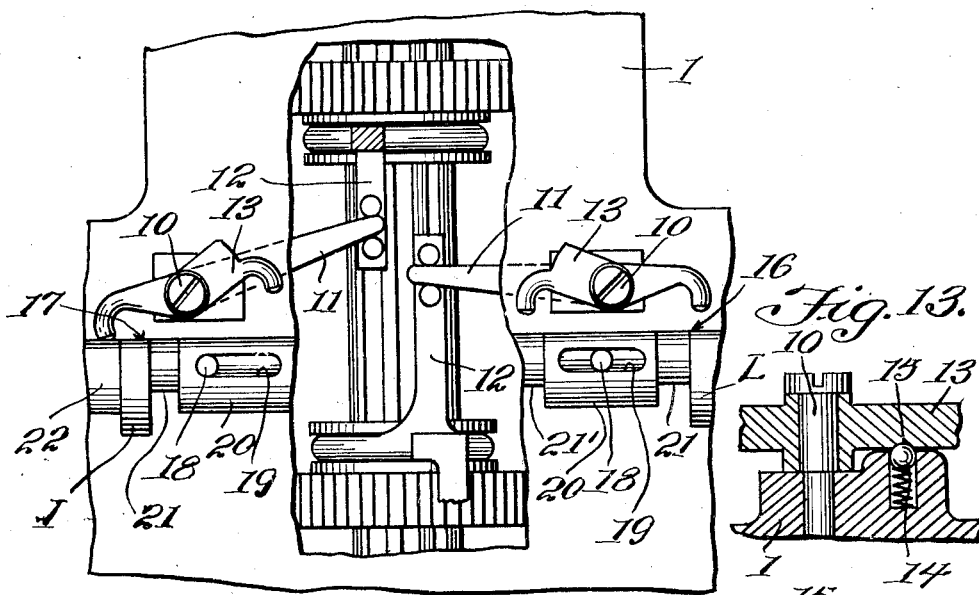
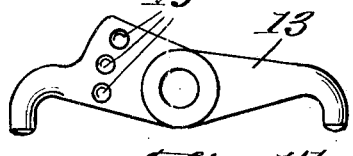
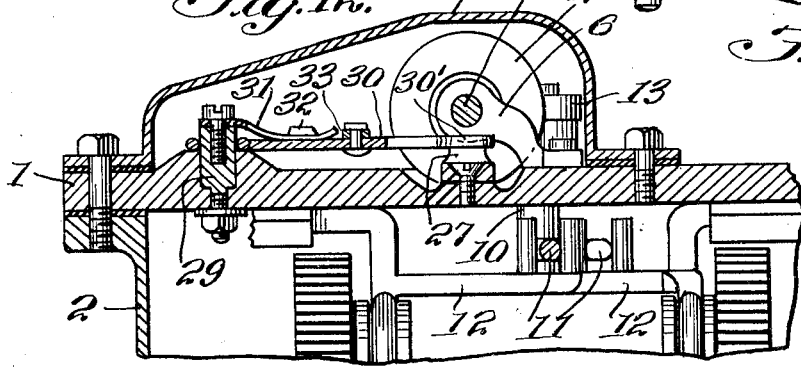
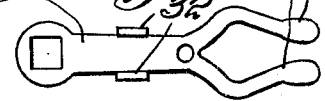
John L. Atkinson INVENTOR
BY Victor J. Evans ATTORNEY
WITNESS:

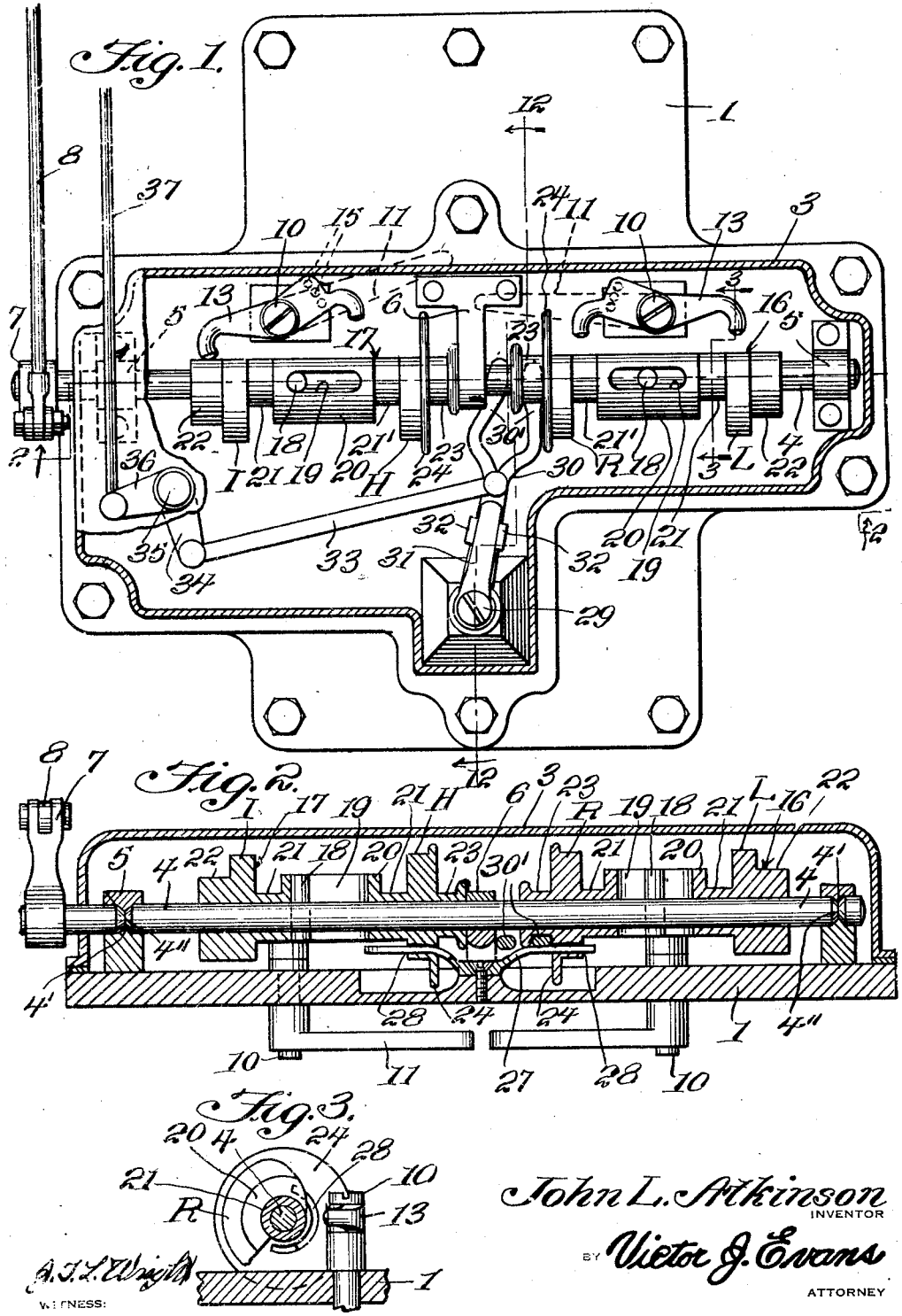

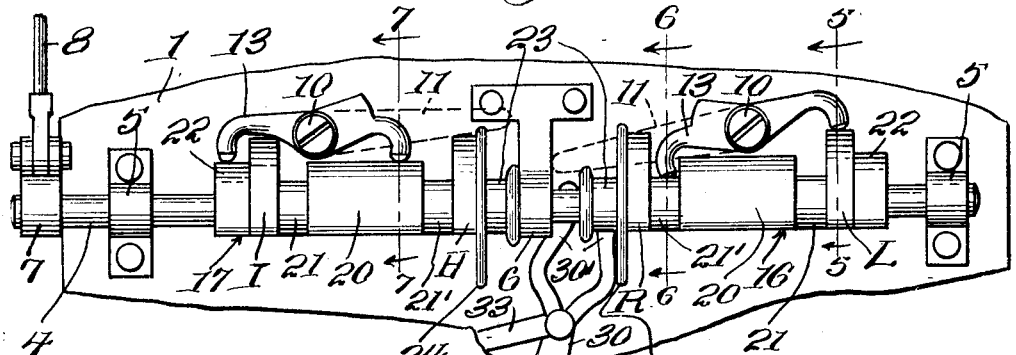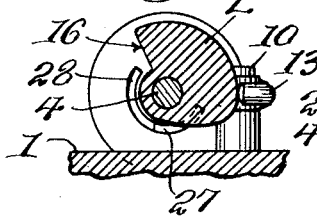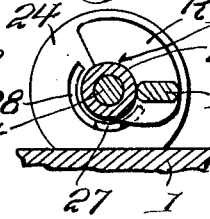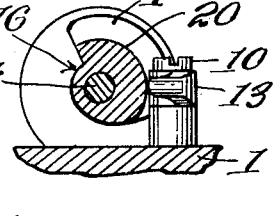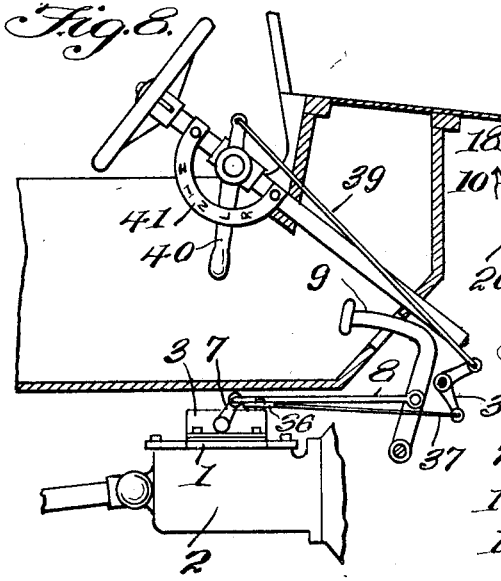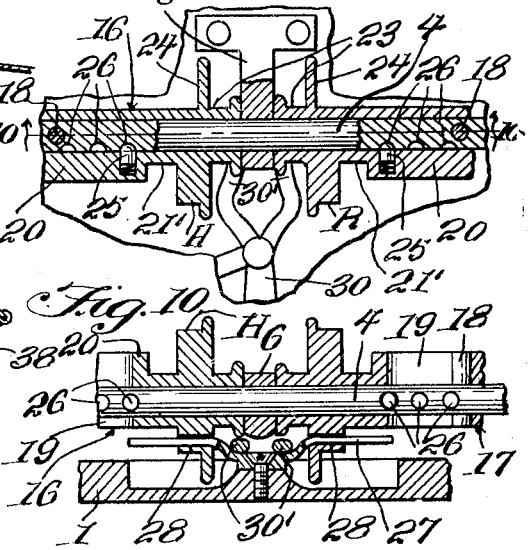

Patented June 4, 1929.

1,715,734

UNITED STATES PATENT OFFICE.

JOHN L. ATKINSON, OF ATLANTA, GEORGIA.

MECHANICAL GEAR SHIFT.

Application filed March 23, 1928. Serial No. 264,066.

This invention relates to a gear shifting mechanism for motor vehicles and the like, the general object of the invention being to provide selecting mechanism operated by a lever on the steering column adjacent the steering wheel and means for moving the transmission gears into mesh by the clutch pedal after the selecting mechanism has been set by the lever, thus eliminating the usual shift lever and providing means whereby the parts can be set to the desired position in advance of the actual shifting by the clutch pedal.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view with parts broken away showing the casing enclosing parts of the invention fastened to the top of the transmission housing.

Figure 2 is a section on line 2—2 of Figure 1.

Figure 3 is a section on line 3—3 of Figure 1.

Figure 4 is a fragmentary plan view showing the cam operating shaft turned to complete the gear shift after the parts have been set, as in Figure 1.

Figure 5 is a section on line 5—5 of Figure 4.

Figure 6 is a section on line 6—6 of Figure 4.

Figure 7 is a section on line 7—7 of Figure 4.

Figure 8 is a sectional view through part of an automobile showing the general arrangement of the invention.

Figure 9 is a sectional view with parts in elevation showing the sleeve shifting fork in neutral position.

Figure 10 is a section on line 10—10 of Figure 9.

Figure 11 is a plan view with parts in section showing how the shifting arms engage the projections of the shifting bars of the ordinary transmission means.

Figure 12 is a section on line 12—12 of Figure 1.

Figure 13 is a detail sectional view showing the detent for holding the shifting lever in set position.

Figure 14 is a bottom plan view of one of the shifting levers.

Figure 15 is a view of the fork for shifting the cam carrying sleeves.

In carrying out my invention, I form the cover plate 1 of the transmission housing 2 as shown, and attach to said cover plate a casing 3 to enclose the major portions of the invention. A shaft 4 is journaled in the end bearings 5 and the central bearing 6 carried by the cover plate within the casing, one end of the shaft extending through the casing, an arm 7 being attached to the projecting end and a link 8 connects said arm with the clutch pedal 9 of the vehicle. Thus the shaft will be rocked when the pedal is depressed and released.

A pair of vertically arranged stub shafts 10 is journaled in the cover plate, with their upper ends extending into the casing and their lower ends into the housing. An arm 11 is attached to the lower end of each stub shaft and the free ends of these arms engage the forks of the shifting bars 12 of the transmission means.

A lever 13 is attached to the upper end of each stub shaft, the levers being provided with bent ends and each lever is locked in any one of three positions by the spring detent 14 engaging any one of three recesses 15 formed in the under face of each lever.

Sleeves 16 and 17 are slidably mounted on the shaft, one on each side of the central bearing and said sleeves are caused to rotate with the shaft through means of the pins 18 carried by the shaft engaging slots 19 in the sleeves. Each sleeve is provided with two high cams, those on the sleeve 16 being marked L and R and those on the sleeve 17 being marked H and I. Each sleeve is also provided with a smaller centrally arranged cam 20 which is of considerable length, and crescent-shaped grooves 21 and 21′ separate the cam 20 from the high cams. A cam 22 is also located at the outer end of each sleeve and a groove 23 is formed on the inner end of each sleeve, one wall of this groove being formed by a disk 24. As shown in Figures 1 and 4, the cams and the grooves which separate them are so arranged that one side of each sleeve is straight, as the cams all extend in the same direction, though the smaller cams are arranged in advance of the larger ones. The straight portions of the sleeves are opposite the levers 13 when the clutch pedal is in its normal position so that the sleeves can be shifted, when the clutch pedal is in this position, without interference on the part of the levers. The sleeves are each held in any one of three positions by a spring detent 25 in each sleeve engaging any one of three recesses 26 formed in the shaft 4.

A guiding member 27 is fastened at its center to the cover 1 under the central bearing, this member having a depressed center with straight end portions, these end portions passing through the semi-circular slots 28 formed in the cams R and H and the disks 24 so that the sleeves can rotate without interference on the part of this guiding member.

A post 29 is rotatably mounted in the cover 1 and extends through a raised part of said cover within the casing and a forked lever 30 has a square opening at one end thereof for receiving the upper end of the post so that the post will be rotated when the lever is rocked. The prongs of the lever are of spring material and have enlarged extremities which rest on the guiding member 27, a spring 31, having one end fastened to the post and its other end bearing on the lever 30 between the upstanding ears 32 thereon, pressing the extremities of the prongs upon the guiding member. This lever is connected by a link 33 to an arm 34 fastened to a stub shaft 35 journaled in the cover plate 1 and extending through the top of the casing 3 and an arm 36 connected with the top of said shaft is connected by a link 37 to one arm of a bell crank 38 journaled in a part of the vehicle and having its other arm connected by a link 39 with one end of a lever 40 pivoted to the steering column of the vehicle adjacent the steering wheel thereof so that when this lever 40 is shifted, the fork 30 will also be shifted through means of the links, the bell crank 38, the shaft 35 and its arms 34 and 36.

A quadrant 41 is fastened to the steering column for the lever 40, indicia being arranged on the quadrant to indicate when the lever is in a position to set the parts for either high, intermediate, low and reverse speeds and when the parts are in a neutral position.

When the lever 40 is on the "neutral" mark, the prongs 30' of the fork 30 will be in the recess formed by the depressed center of the guiding member 27, with both of the sleeves having their inner ends abutting the central bearing. Then when the clutch pedal is depressed to release the clutch, the shaft will be rocked, carrying both sleeves with it, so that the cam 22 on that sleeve opposite the lever 13 which is in tilted position will strike the outer end of the lever and force it into a straight or neutral position, thus causing the arm 11, which is attached to the shaft 10 to which the lever 13 is attached to move the shifting bar 12 to throw the transmission gears out of mesh. When the vehicle is to be started, the hand lever 40 is moved to the low speed mark on the quadrant 41 which will shift the fork 30 to the right in Figures 1 and 2, so that one of the prongs 30' thereof will enter the groove 23 of the right hand sleeve 16 as the prong rides up the incline which connects the straight part of the guiding member 27 with the depressed central portion thereof. Thus the fork will shift the right hand sleeve to the right and place the cam L under the outer end of the right hand lever 13. Then the clutch pedal is depressed to release the clutch and to rock the shaft so that the cam L will strike the outer end of the lever 13 and rock the shaft 10 to cause the arm 11 on said shaft to throw the low gears of the transmission gears into mesh. As the lever 13 is rocked, its inner end will enter the groove 21' in the sleeve. As the clutch lever is released to engage the clutch, the shaft is rocked in a reverse direction so that the straight part of the sleeve will be brought opposite the lever 13, the lever 13 being held in its adjusted position by the detent 14. The transmission gears are now in low speed and the car proceeds at this speed. The lever 40 is then moved to intermediate position and this will shift the fork 30 from the position it occupies in Figure 2, through the central depression of the guiding member to a position directly opposite that shown in Figure 2, so that the right hand sleeve 16 will be returned to its original position and the left hand sleeve 17 will be pushed outwardly so that the cam I is under the outer end of the left hand lever 13 and the cam 20 of the right hand sleeve 16 is under the inner end of the right hand lever. Then the pedal is depressed, releasing the clutch and rocking the shaft and the sleeves to first move the right hand lever 13 through means of the cam 20 to its straight and neutral position to move the low speed gears out of mesh and then the intermediate cam I will rock the left hand lever 13 to move the intermediate gears into mesh so that the car will proceed in intermediate gear when the clutch is engaged. Then the lever 40 is moved to the high speed mark, which will shift the sleeve 17 farther to the left and place the high speed cam H under the inner end of the left hand lever 13 so that when the pedal is depressed again, the left hand lever 13 will be tilted and move the high speed gears of the transmission into mesh. When the car is to be reversed, the lever 40 is moved to the reverse mark, which will cause the fork 30 to move the sleeve 16 to its extreme outward position and place the cam R under the inner end of the right hand lever 13. Then when the pedal is depressed, the cam 20 of sleeve 17, which has been moved back to its inner position by the shifting of the fork 30, can move the left hand lever 13 to neutral position and then the cam R will tilt the right hand lever 13 to throw the reverse gears into mesh.

Thus it will be seen that I have provided simple means whereby the parts can be set by the hand lever arranged adjacent the steering wheel in advance of the actual gear shifting operation so that it is simply necessary to depress the clutch lever and release the same to shift the gears when it is desired to shift said gears. This renders it possible, for instance, for a driver approaching a hill to set the parts to low speed or intermediate speed position and then, when the car starts to labor on the hill, all that is necessary is for the driver to depress the clutch and release the same to shift the gears into intermediate or low speed. As the hand lever is adjacent the steering wheel, the lever can be shifted in an instant and thus leave both hands free to steer with, and by eliminating the shifting lever, three persons can occupy the front seat without interfering with the driver.

The shaft 4 is held against longitudinal movement by projections 4' formed in the end bearings and engaging grooves 4'' formed in those portions of the shaft which are located in the bearings.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. In combination with the transmission means and clutch pedal of a motor vehicle, a pair of stub shafts journaled in the transmission cover, arms on the inner ends of the shaft engaging the shifting bars of the transmission means, a lever on the outer end of each shaft having its ends turned rearwardly, a casing supported on the cover, a shaft journaled in the casing, means for rocking the shaft by the actuation of the clutch pedal, a pair of sleeves on the shaft, means for connecting the sleeves with the shaft to cause them to rotate with the shaft and to have sliding movement on the shaft, cams on each sleeve for engaging the bent ends of each lever to cause the same to move the transmission gears into and out of mesh, a fork pivoted in the casing, guiding means for the prongs of the fork for causing them to engage and disengage portions of the sleeves to shift the sleeves, a hand lever pivoted to the steering column adjacent the steering wheel, connections from the lever to the fork and a quadrant for the lever.

2. In a motor vehicle and in combination with its transmission means and clutch pedal, a casing mounted on the cover of the transmission means, a pair of stub shafts journaled in the cover with their upper ends in the casing, arms on the lower ends of the shafts engaging the forks of the shifting bars of the transmission means, a lever fastened to the upper end of each shaft, the ends of each lever being turned rearwardly, spring locking means for holding each lever in adjusted position, a shaft journaled in the casing and connected with the clutch pedal so that the shaft will be rocked when the pedal is actuated, a pair of cam carrying sleeves on the shaft, a pin and slot connection between each sleeve and the shaft, each sleeve having high cams thereon for engaging the bent ends of each lever for tilting the lever to move the transmission gears into mesh and each sleeve having low cams thereon for moving the lever into neutral position, each sleeve having a groove at its inner end, a fork pivoted in the casing and having its prongs adapted to engage the grooves, guiding means for the prongs for guiding them into and out of the grooves as the fork is shifted, a hand lever pivoted to the steering column adjacent the steering wheel, and means for connecting the hand lever with the fork to shift the fork when the hand lever is moved.

3. In a motor vehicle and in combination with its transmission means and clutch pedal, a casing mounted on the cover of the transmission means, a pair of stub shafts journaled in the cover with their upper ends in the casing, arms on the lower ends of the shafts engaging the forks of the shifting bars of the transmission means, a lever fastened to the upper end of each shaft, the ends of each lever being turned rearwardly, spring locking means for holding each lever in adjusted position, a shaft journaled in the casing and connected with the clutch pedal so that the shaft will be rocked when the pedal is actuated, a pair of cam carrying sleeves on the shaft, a pin and slot connection between each sleeve and the shaft, each sleeve having high cams thereon for engaging the bent ends of each lever for tilting the lever to move the transmission gears into mesh and each sleeve having low cams thereon for moving the lever into neutral position, each sleeve having a groove at its inner end, a fork pivoted in the casing and having its prongs adapted to engage the grooves, guiding means for the prongs for guiding them into and out of the grooves as the fork is shifted, a hand lever pivoted to the steering column adjacent the steering wheel, means for connecting the hand lever with the fork to shift the fork when the hand lever is moved, and yieldable locking means for locking the sleeves in adjusted position.

In testimony whereof I affix my signature.

JOHN L. ATKINSON.